(12) United States Patent
Matsumoto

(10) Patent No.: US 7,667,758 B2
(45) Date of Patent: Feb. 23, 2010

(54) IMAGE PICKUP APPARATUS FOR DISPLAYING IMAGES AND INFORMATION OF STATES AND METHOD FOR CONTROLLING THE SAME

(75) Inventor: Yukihiro Matsumoto, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 11/609,630

(22) Filed: Dec. 12, 2006

(65) Prior Publication Data

US 2007/0159549 A1     Jul. 12, 2007

(30) Foreign Application Priority Data

Jan. 6, 2006     (JP)     ............... 2006-001428

(51) Int. Cl.
*H04N 5/222* (2006.01)
(52) U.S. Cl. ................................. 348/333.04
(58) Field of Classification Search ............ 348/333.01, 348/333.02, 333.04, 333.13
See application file for complete search history.

(56) References Cited

U.S. PATENT DOCUMENTS

| | | | | |
|---|---|---|---|---|
| 5,699,115 A | * | 12/1997 | Hiraki et al. | ............ 348/333.13 |
| 5,745,798 A | * | 4/1998 | Hirasawa | ..................... 396/51 |
| 6,091,450 A | * | 7/2000 | Hirasawa | ............... 348/333.01 |
| 7,030,928 B2 | * | 4/2006 | Inagaki | ........................ 348/372 |

FOREIGN PATENT DOCUMENTS

| | | | | |
|---|---|---|---|---|
| JP | 08331438 | A | * | 12/1996 |
| JP | 2003319213 | A | * | 11/2003 |
| JP | 2004-201104 | A | | 7/2004 |

\* cited by examiner

*Primary Examiner*—John M Villecco
(74) *Attorney, Agent, or Firm*—Canon USA Inc. IP Div

(57) ABSTRACT

A digital single-lens reflex camera determines whether a predetermined time has passed since the start of display. If the predetermined time has not passed yet, the camera performs face detection to determine if a user is looking into an optical finder of the camera. When the face detection is performed, a system control circuit identifies the present content displayed. When the displayed content is an ordinary image, photographing information, or attention-seeking alert, display of the content is immediately stopped. When the displayed content is alert prohibiting imaging, it is checked whether a switch operation has been performed. If the switch operation has not been performed at all, or a switch operation for canceling the displayed alert has not been performed, timer counting is cleared before the timer counting is initiated again.

15 Claims, 7 Drawing Sheets

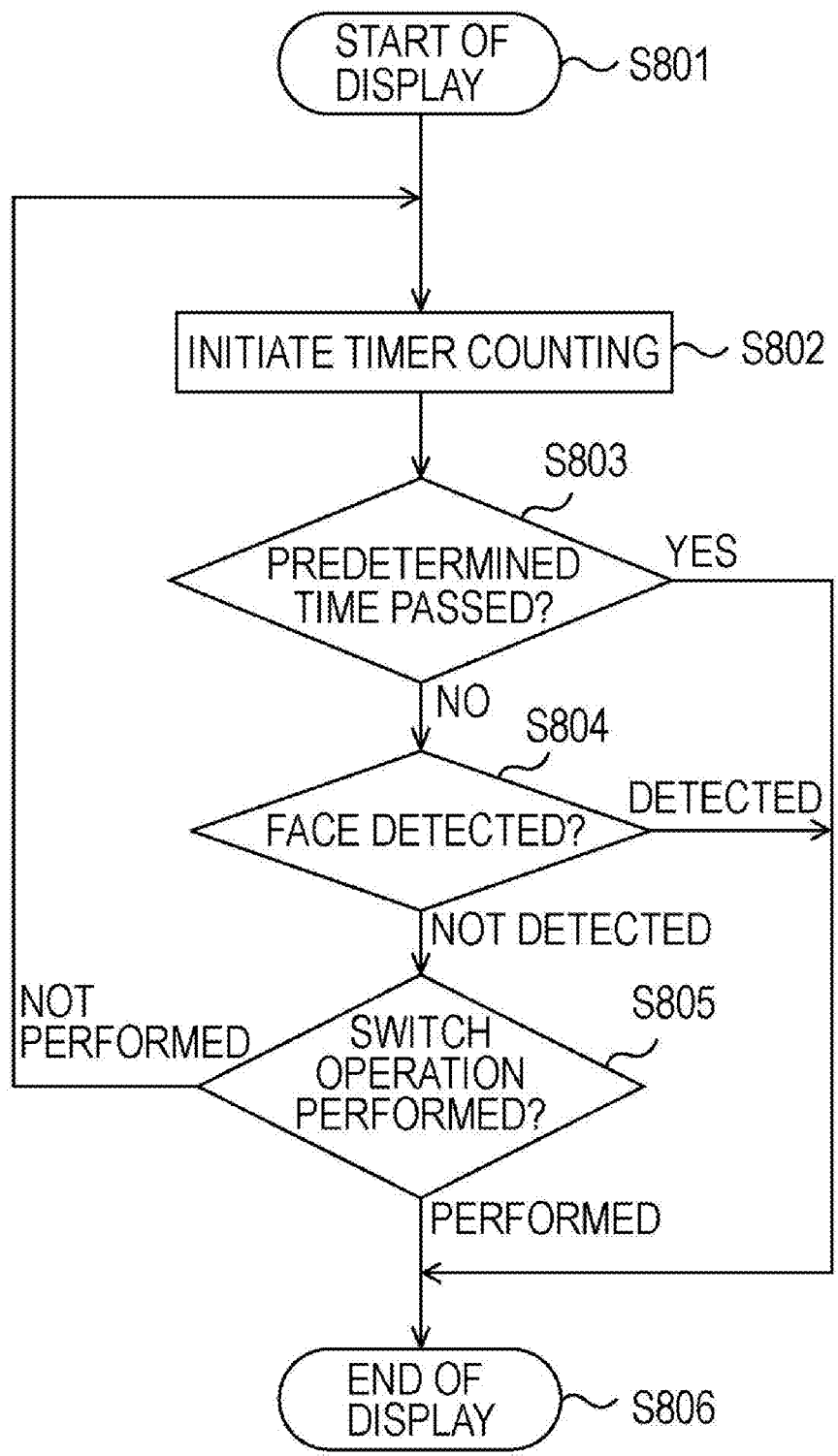

IMAGE PICKUP APPARATUS FOR DISPLAYING IMAGES AND INFORMATION OF STATES AND METHOD FOR CONTROLLING THE SAME

BACKGROUND OF THE INVENTION

1. Field of the Invention

The present invention relates to an image pickup apparatus including a display device for displaying images and information of states of the image pickup apparatus, and a method for controlling the image pickup apparatus.

2. Description of the Related Art

Reduction in camera size has produced a type of camera that displays information (such as a shutter speed and an aperture value) necessary for imaging and a captured image on the same display device. The information, which is hereinafter referred to as "photographing information", such as the shutter speed and the aperture speed, needs to be set depending on circumstances and needs to be displayed before and after imaging.

Regarding the display device for use in image display, a liquid crystal display device such as a TFT (thin-film transistor) liquid crystal display device, and an organic EL (electroluminescence) device or the like are known. Each device is disposed on a back surface of a camera similarly to a finder because of its size and its configuration in which the device uses predetermined luminance light to allow a user to confirm an image displayed by the device in a display mode. This causes problems in that, when the user looks into the finder, the user cannot see the image displayed on the display device, and in that, when the display device shines with a predetermined luminance or greater, the user feels that the light is too bright. In addition, for power saving, when it is not necessary to display an image, it is preferable to stop display operation of the image displayed on the display device.

Accordingly, there has been proposed a camera in which, by detecting whether a user looks into a finder, that is, whether the user brings the user's eye or face to the finder, the camera can automatically stop display operation of a display device simultaneously with the user's holding of the camera. A control operation of the display device of the above camera is described below with reference to the flowchart shown in FIG. 8.

When the display device is controlled to initiate display of an image or camera-state information (step S801), timer counting is initiated by activating a timer (step S802). The timer counting is performed in order to determine timing with which display of a displayed image is stopped or to periodically detect whether the user's face is brought to the finder (hereinafter referred to as "face detection" in this specification).

In step S803, it is determined whether a predetermined time has passed since the start of display. If the predetermined time has not passed yet, in step S804, face detection is performed.

When, in step S804, the face detection has been performed, in step S806, display of the image is immediately stopped. Conversely, when, in step S804, the face detection has not been performed, in step S805, it is determined whether a switch operation has been performed. If the switch operation has not been performed, the operation returns to step S802 and the timer counting is continuously performed. If the switch operation has been performed, in step S806, display of the image is stopped in order to perform processing in response to the switch operation.

If, in step S803, the predetermined time has passed, in step S806, display of the image is immediately stopped.

Japanese Patent Laid-Open No. 2004-201104 discloses control of an image pickup apparatus so that, when an eye-proximity sensor detects proximity of user's eyes to an EVF (electric view finder), an image is displayed by the EVF, and, when the eye-proximity sensor does not detects the proximity, an image is displayed on a back LCD (liquid crystal display).

SUMMARY OF THE INVENTION

An embodiment of the present invention provides an image pickup apparatus in which, when an approach detecting unit detects approach of an object to an optical finder thereof, a display device is controlled whether to stop a display operation based on a type of content displayed on the display device.

According to an aspect of the present invention, an image pickup apparatus including a display device for displaying alert information and others is provided. The image pickup apparatus includes a displayed-content determination unit which determines whether the alert information is displayed on the display device, an approach detecting unit which detects approach of an object to the image pickup apparatus, and a control unit which, when the approach detecting unit detects the approach of the object, controls whether to stop a display operation of the display device based on a result of determination by the displayed-content determination unit.

According to another aspect of the present invention, an image pickup apparatus including a display device for displaying alert information and others is provided. The image pickup apparatus includes a displayed-content determination unit which determines whether the alert information is displayed on the display device, an approach detecting unit which detects approach of an object to the image pickup apparatus, a display control unit which stops a display operation of the display device in response to detection of the approach of the object by the approach detecting unit, and an operating period setting unit which sets an operating period of the approach detecting unit in response to a result of determination by the displayed-content determination unit.

According to another aspect of the present invention, a method for controlling an image pickup apparatus including a display device is provided. The method includes determining whether alert information is displayed on the display device of the image pickup apparatus, detecting approach of an object to an optical finder of the image pickup apparatus, and when the approach of the object to the optical finder is detected, controlling whether to stop a display operation of the display device based on whether alert information is displayed on the display device.

According to another aspect of the present invention, a method for an image pickup apparatus including a display device is provided. The method includes determining whether alert information is displayed on the display device of the image pickup apparatus, changing the operating period of an approach detecting unit based on a result of the determination of whether alert information is displayed on the display device, and using the approach detecting unit to detect approach of an object to an optical finder of the image pickup apparatus.

Other aspects and features of embodiments of the present invention will become apparent from the following description and the attached drawings.

BRIEF DESCRIPTION OF THE DRAWINGS

FIG. 8 is a flowchart illustrating a control operation of a display device of the related art.

DESCRIPTION OF THE EMBODIMENTS

Exemplary embodiments of the present invention are described below with reference to the accompanying drawings.

First Embodiment

Figure 1:
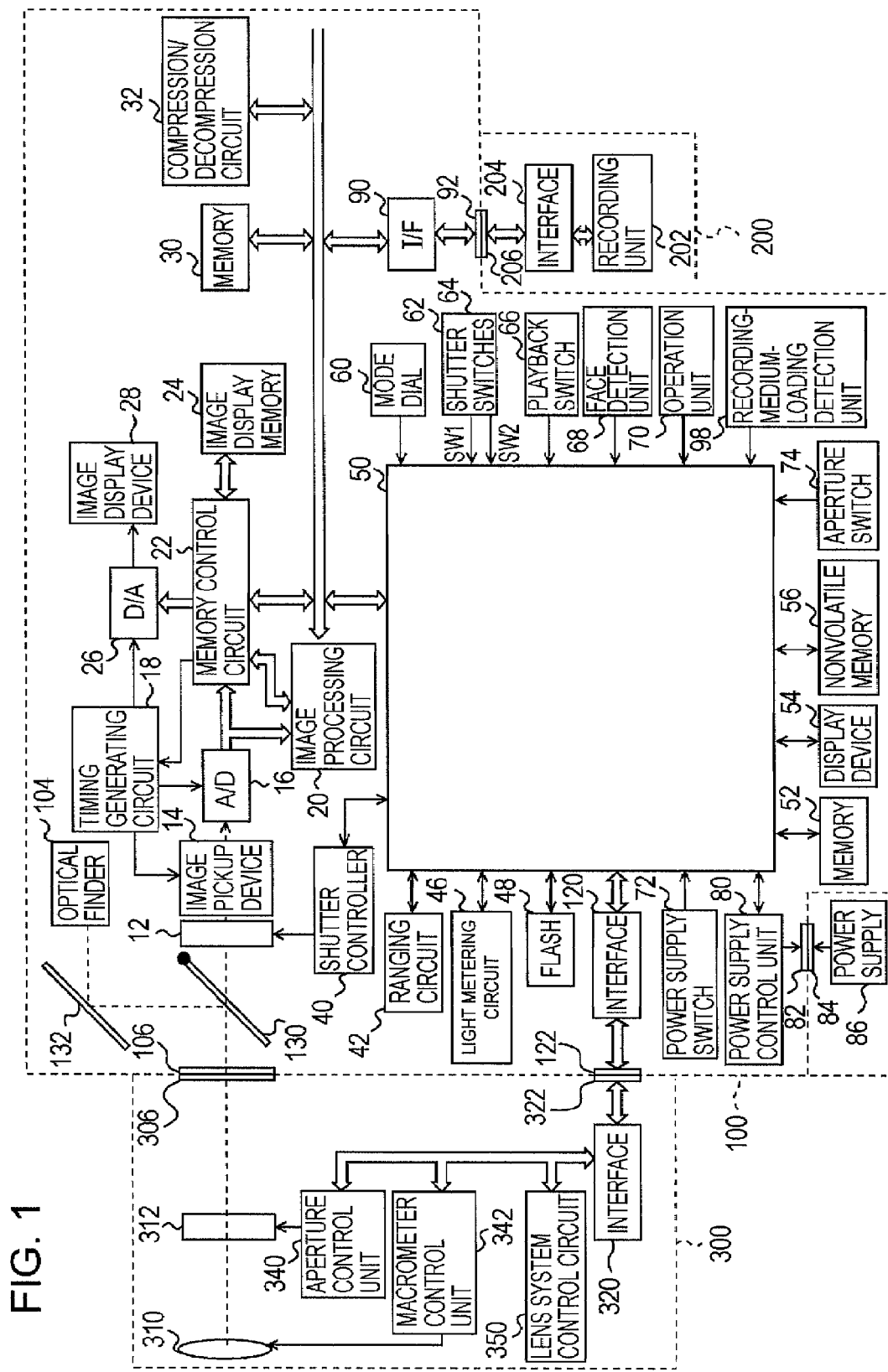
FIG. 1 is a block diagram showing the configuration of a digital single-lens reflex camera as an image pickup apparatus according to an embodiment of the present invention.

FIG. 1 is a block diagram showing the configuration of a digital single-lens reflex camera 100 as an image pickup apparatus according to a first embodiment of the present invention.

A shutter 12 controls exposure to an image pickup device 14. The image pickup device 14 converts an optical image into an electric signal. Rays of light incident on a lens 310 of a lens unit 300 form an optical image on the image pickup device 14 in a single-lens reflex system after being conducted through an aperture 312, lens mounts 306 and 106, a mirror 130, and the shutter 12.

An analog-to-digital converter 16 converts an analog signal output from the image pickup device 14 into a digital signal. A timing generating circuit 18 supplies clock and control signals to the image pickup device 14, the analog-to-digital converter 16, and a digital-to-analog converter 26. The timing generating circuit 18 is controlled by a memory control circuit 22 and a system control circuit 50.

An image processing circuit 20 performs predetermined processing, such as pixel interpolation or color conversion, on data from the analog-to-digital converter 16 or data from the memory control circuit 22. A focus detecting circuit 42, a light metering circuit 46, and a flash 48 perform TTL (through-the-lens) AF (auto-focus) processing, AE (auto-exposure) processing, and EF (electronic flash pre-emission) processing, respectively, by using the system control circuit 50. The image processing circuit 20 uses captured image data to perform predetermined calculation, and performs TTL AWB (auto-white-balance) processing on the basis of the result of the calculation.

The memory control circuit 22 controls the analog-to-digital converter 16, the timing generating circuit 18, an image display memory 24, the digital-to-analog converter 26, the memory 30, and a compression/decompression circuit 32. Data in the analog-to-digital converter 16 is written into the image display memory 24 or the memory 30 after passing through the image processing circuit 20 and the memory control circuit 22, or after directly passing through the memory control circuit 22.

An image display device 28 is formed by a TFT LCD or the like. The image data written in the image display memory 24 for display is displayed by the image display device 28 after passing through the digital-to-analog converter 26.

The image display device 28 also displays camera-state information instead of an image in response to an instruction from the system control circuit 50. The displayed camera-state information includes, for example, a single-shot/continuous-shooting-operation indication, a self-timer indication, a compression rate, the number of pixels for recording, the number of images recorded, the number of remaining images capable of imaging, a shutter speed, an aperture value, an exposure correction indication, a flash indication, a red-eye relaxation indication, a macro-shooting indication, a buzzer setting indication, an indication of the remaining battery power for a clock, a remaining battery power indication, an error indication, an information indication with a plural digit number, an indication of a loading state of a recording medium 200, an indication of a loading state of the lens unit 300, a communication interface operation indication, a date and time, an indication of connection to an external computer, and alert indication reporting a camera-detected abnormal state. Types of the alert indication include fatal alert (imaging prohibition alert) of inability to perform imaging or recording which is displayed when a recording medium having no free storage space or needs to be initialized is detected as the recording medium 200, and when the storage required for imaging cannot be obtained. In addition, there are many types of the alert indication such as an attention-seeking alert indication that is displayed when the recording medium 200 is not loaded.

The information displayed on the image display device 28 is also displayed by a display device formed by installing some functions of the image display device 28 in the optical finder 104. Information displayed in the optical finder 104 includes, for example, an in-focus-state indication, an imaging ready indication, a camera shake alert indication, a flash charging indication, a flash charging ready indication, a shutter speed, an aperture value, an exposure correction indication, and an indication of writing to a recording medium.

The image display device 28 can arbitrarily turn on and off the displayed image in response to an instruction from the system control circuit 50. When the displayed image is off, power consumption of the digital single-lens reflex camera 100 can considerably be reduced.

The memory 30 is used to store data of captured still images and moving images, and has a storage size enough to store data of a predetermined number of still images and data of moving images for a predetermined time. Accordingly, even in a continuous shooting operation and panoramic shooting in which a plurality of still images are consecutively captured, a large amount of data can be written into the memory 30 at high speed. The memory 30 may also be used as a work area for the system control circuit 50.

The compression/decompression circuit 32 compresses and decompresses image data by using a technique such as ADCT (adaptive discrete cosine transformation). After the compression/decompression circuit 32 reads an image stored in the memory 30, the compression/decompression circuit 32 performs a compressing or decompressing process on the read image, and writes the processed data into the memory 30.

A shutter controller 40 controls the shutter 12 on the basis of metering information from the light metering circuit 46 in cooperation with an aperture control unit 340 for controlling the aperture 312.

The focus detecting circuit 42 is used to AF processing. By using the single-lens reflex system to allow the rays of light incident on the lens 310 to be incident on the focus detecting circuit 42 after passing through the aperture 312, lens mounts 306 and 106, the mirror 130, and a focus detecting sub-mirror (not shown), an in-focus state of an image formed as an optical image is measured.

The light metering circuit 46 is used to perform AE processing. By using the single-lens reflex system to allow the rays of light incident on the lens 310 to be incident on the light metering circuit 46 after passing through the aperture 312, the lens mounts 306 and 106, the mirrors 130 and 132, and a light metering lens (not shown), an exposure state of an image formed as an optical image is measured. The light metering circuit 46 also has an EF processing function by cooperating with the flash 48.

The flash 48 also has an AF fill-in light projecting function and a flash pre-emission function. The system control circuit 50 controls the entirety of the digital single-lens reflex camera 100. A memory 52 stores constants, variables, and programs for operation. A nonvolatile memory 56 is electrically erasable and recordable. For example, an electronically erasable and programmable read only memory or the like is used as the nonvolatile memory 56.

Reference numerals 60, 62, 64, 66, 68, 70, and 74 denote operating devices for inputting various operation instructions to the system control circuit 50. The operating devices include switches, a dial, a touch panel, a pointing device using detection of a line of sight, a speech recognition device, and sensors, or combinations of these.

The operating devices are specifically described below. A mode dial 60 is a mode dial switch that can switch and set various function modes such as an automatic shooting mode, a program shooting mode, a shutter speed priority AE photographing mode, an aperture priority AE photographing mode, a manual shooting mode, a focal-depth-priority shooting mode, a portrait shooting mode, a landscape shooting mode, a closeup shooting mode, a sports shooting mode, a night view shooting mode, and a panoramic shooting mode.

A first shutter switch 62 (SW1) is turned on in the middle of an operation on a shutter button (not shown). The first shutter switch 62 orders initiating operations such as the AF processing, the AE processing, the AWB processing, and the EF processing.

A second shutter switch 64 (SW2) is turned on at completion of the operation on the shutter button (not shown). The second shutter switch 64 orders initiating consecutive processes such as an exposure process for writing a signal read from the image pickup device 14 into the memory 30 by using the analog-to-digital converter 16 and the memory control circuit 22, a developing process using calculations by the image processing circuit 20 and the memory control circuit 22, and a recording process for reading image data from the memory 30, using the compression/decompression circuit 32 to compress the read image data, and writing the compressed image data on the recording medium 200.

A playback switch 66 orders initiating an playback operation which, in an imaging mode, reads captured image data from the memory 30 or the recording medium 200, and uses the image display device 28 to display the read image data.

A face detection unit 68 can detect predetermined distance approach of a face to the optical finder 104 for imaging.

An operation unit 70 includes various buttons and a touch panel. The operation unit 70 includes a menu button, a set-button, a macro-button, a multi-screen-playback form-feed button, a shutter setting device for setting a shutter speed when the shutter speed priority AE photographing mode is set by using the mode dial 60, an aperture setting device for setting an aperture when the aperture priority AE photographing mode is set by using the mode dial 60, a flash setting button, single-shooting/continuous-shooting/self-timer switching button, a menu moving plus button, a menu moving button, a playback image moving button, a playback image minus button, a shooting image quality selecting button, an exposure correcting button, a date/time setting button, a selection/switching button for setting selection and switching of various functions when executing imaging and playback as a panoramic mode, etc., a determination/execution button for setting determination and execution of each function when executing imaging and playback in a mode such as a panoramic mode, etc., an image display ON/OFF switch for setting the ON/OFF of the image display device 28, a quick review ON/OFF switch for setting a quick review function for automatically playing back captured image data immediately after imaging, a compression mode switch for selecting a compression ratio of JPEG compression or for selecting a CCD RAW mode in which an image pickup device signal is directly digitized and recorded on a recording medium, a playback switch for setting each of function modes such as a playback mode, a multi-screen playback/erasure mode, and a personal computer connection mode, and an AF mode setting switch for setting a single-shot AF mode in which, once the first shutter switch 62 (SW1) is pressed, an auto-focus operation is initiated and, once focusing is established, the in-focus state is continuously maintained, and a servo AD mode in which the auto-focus operation is consecutively continued during pressing of the first shutter switch 62 (SW1). In addition, regarding each function of the above plus and minus buttons, by providing a rotating dial switch, a numerical value and a function can be more easily selected.

A power supply switch 72 can switch and set a power-on mode and power-off mode of the digital single-lens reflex camera 100. The power supply switch 72 can also switch and set power-on and power-off settings of accessory devices such as the lens unit 300 connected to the digital single-lens reflex camera 100, an external strobe, and the recording medium 200.

An aperture switch 74 can control an aperture 312 of the lens unit 300 so that the aperture 312 has an aperture value displayed on the display device 54.

A power supply control unit 80 includes a battery detecting circuit, a DC-DC converter, and a switch circuit for switching blocks to be supplied with power. The power supply control unit 80 detects battery loading, a battery type, and remaining battery power, controls the DC-DC converter on the basis of detection results and an instruction from the system control circuit 50, and supplies necessary voltages to blocks including the recording medium 200.

The digital single-lens reflex camera 100 also includes connectors 82 and 84. A power supply 86 includes a primary battery such as an alkaline battery or a lithium battery, or a secondary battery such as a NiCd, NiMH, or Li battery, and an AC adapter.

An interface 90 is used to interface with a recording medium such as a memory card or a hard disk. A connector 92 is used to establish connection to the recording medium such as a memory card or a hard disk. A recording-medium-loading detection unit 98 detects whether the recording medium 200 is loaded to connect to the connector 92. The first embodiment describes a case in which the number of systems of interfaces and connectors to which the recording medium 200 is connected is only one. Obviously, the number of systems of interfaces and connectors to which the recording medium 200 is connected may be singular or plural. In addition, interfaces and connectors in accordance with different types of specifications may be combined. As the interfaces and the connectors, those that comply with PCMCIA (Personal Computer Memory Card International Association) card or CF (Compact Flash) card specifications may be used. When one complying with PCMCIA card or CF card specifications is used as each of the interface 90 and the connector 92, by connecting, to the digital single-lens reflex camera 100, a communication card such as a LAN (local area network) card, a modem card, a USB card, an IEEE 1394 card, a P1284 card, a SCSI (small computer system interface) card, or a PHS (personal handy phone) card, image data and management information associated therewith can be mutually transferred between the digital single-lens reflex camera 100 and a computer or a peripheral apparatus such as a printer.

The optical finder 104 can form a focused image as an optical image by using the single-lens reflex system to conduct the rays of light incident on the lens 310 through the aperture 312, the lens mounts 306 and 106, and the mirrors 130 and 132.

An interface 120 connects the digital single-lens reflex camera 100 to the lens unit 300 in the lens mount 106. A connector 122 electrically connects the digital single-lens reflex camera 100 to the lens unit 300. The system control circuit 50 detects whether the lens unit 300 is loaded into the connector 122. The connector 122 has a function of transmitting signals, such as a control signal, a status signal, and a data signal, between the digital single-lens reflex camera 100 and the lens unit 300, and supplying currents at various voltages. The connector 122 may be configured to perform transmission not only for telecommunication but also for optical communication and audio communication.

The mirrors 130 and 132 can conduct the rays of light incident on the lens 310 to the optical finder 104 by using the single-lens reflex system. The mirror 132 may be configured either as a quick return mirror or as a half mirror.

The recording medium 200 is a type of recording medium such as a memory card or a hard disk. The image processing circuit 20 includes a recording unit 202 formed by a semiconductor memory or a magnetic disk, an interface 204 with the digital single-lens reflex camera 100, a connector 206 for connecting to the digital single-lens reflex camera 100.

The lens unit 300 is of an interchangeable lens type. A lens mount 306 is mechanically coupled with the digital single-lens reflex camera 100. The lens mount 306 includes various functions for electrically connecting the lens unit 300 to the digital single-lens reflex camera 100.

The lens 310 is an imaging lens. The interface 320 connects the lens unit 300 to the digital single-lens reflex camera 100 in the lens mount 306. A connector 322 electrically connects the lens unit 300 to the digital single-lens reflex camera 100. The connector 322 has functions of transmitting signals, such as a control signal, a status signal, and a data signal, between the digital single-lens reflex camera 100 and the lens unit 300, and of supplying or being supplied with currents at various voltages. The connector 322 may be configured to perform transmission not only for telecommunication but also for optical communication and audio communication.

While cooperating with the shutter controller 40 for controlling the shutter 12, the aperture control unit 340 controls the aperture 312 on the basis of the light metering information from the light metering circuit 46 or the result of calculating the image data from the image pickup device 14 by the image processing circuit 20. A focus detecting control unit 342 controls focusing of the lens 310.

A lens system control circuit 350 controls the entirety of the lens unit 300. The lens system control circuit 350 has a memory function of storing constants, variables, and programs for operations, and a nonvolatile memory function of storing identification information such as a unique number of the lens unit 300, management information, functional information such as an open aperture value and a minimum aperture value, and present and past setting values.

Figure 2:
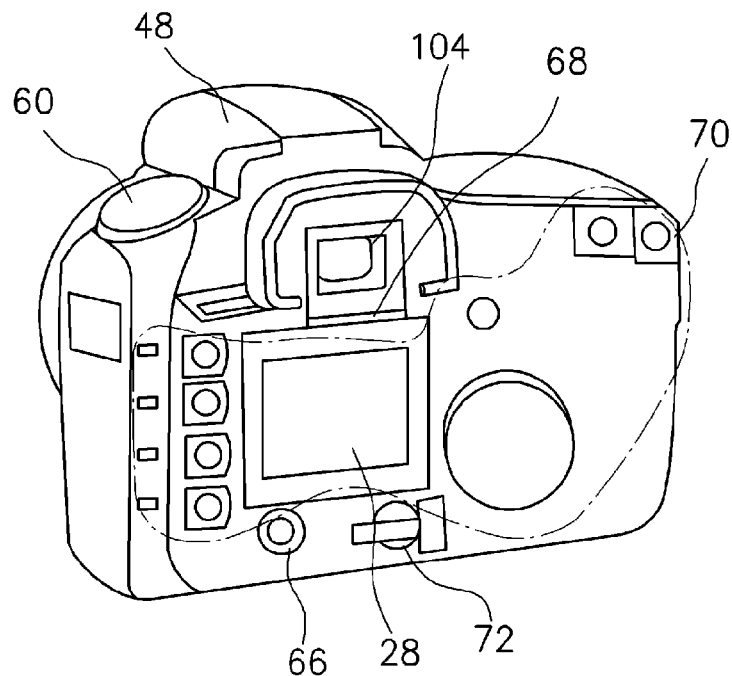
FIG. 2 is an exterior view of the digital single-lens reflex camera according to the first embodiment.

FIG. 2 is an exterior view of the digital single-lens reflex camera 100 according to the first embodiment. FIG. 2 is a back view of the digital single-lens reflex camera 100. The flash 48, mode dial 60, operation unit 70, power supply switch 72 and playback switch 66 described with reference to FIG. 1 are provided at appropriate positions. The optical finder 104, the face detection unit 68, and the image display device 28 are provided on the same surface (back surface). The face detection unit 68 may be a mechanism including a photo-projector and a photo-receiver and capable of determining an accurate distance on the basis of the principle of triangulation, or a mechanism capable of determining whether an object is in proximity on the basis of whether the photo-receiver receives a signal from the photo-projector.

Figure 3:
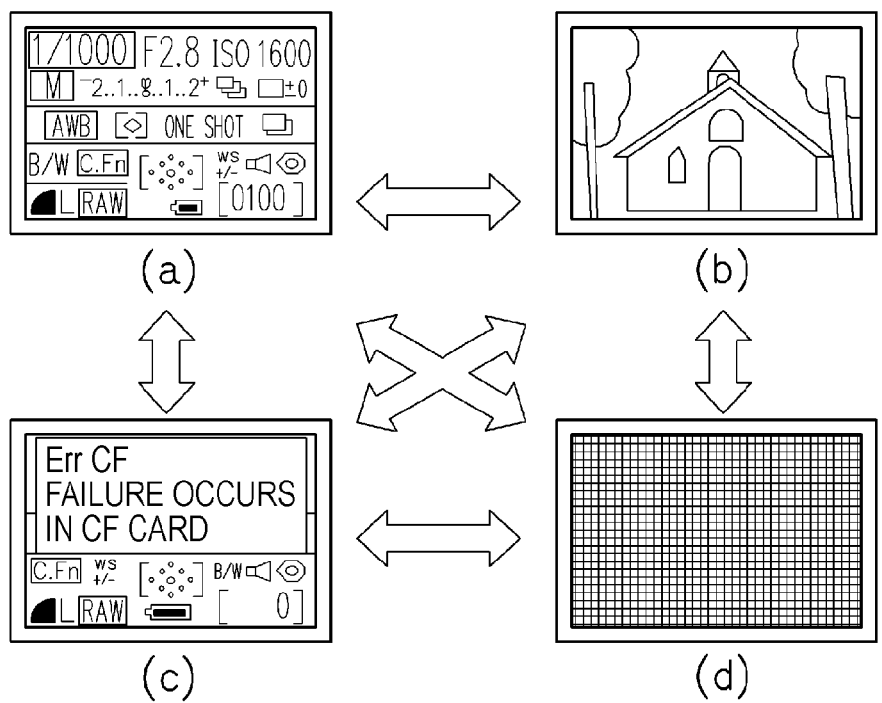
FIG. 3 illustrates examples of images displayed on an image display device of the digital single-lens reflex camera according to the first embodiment.

FIG. 3 shows examples of images displayed on the image display device 28 of the digital single-lens reflex camera 100 according to the first embodiment. Ordinarily, there are four display states (a), (b), (c), and (d) as displayed image states of the image display device 28, and they change depending on the state of the digital single-lens reflex camera 100.

The state (a) in FIG. 3 is a standby state that is not a power-saving state. The state (d) in FIG. 3 is a state in which a display operation is stopped for power saving although the state (d) is a standby state, or one of a power-off state and a sub-power-off state. The state (b) in FIG. 3 is an image confirmation state immediately after shooting or an image playback state. The state (c) in FIG. 3 is a state in which a user needs to be careful for shooting, or an alert indication state for warning that imaging is impossible.

For example, when imaging is performed, the digital single-lens reflex camera 100 changes from the state (a) in FIG. 3 to the state (b) in FIG. 3 after imaging, and returns to the state (a) in FIG. 3 again. If, in the middle of operating the digital single-lens reflex camera 100, the need to be careful or what should be warned occurs, the digital single-lens reflex camera 100 enters the state (c) in FIG. 3 to notify the user.

When the digital single-lens reflex camera 100 is left for a predetermined time in the state (a) or (b) in FIG. 3, the digital single-lens reflex camera 100 switches to a state (the state (d) in FIG. 3) in which a display operation is stopped for power saving. In addition, when the digital single-lens reflex camera 100 is in the state (c) in FIG. 3 and is left for a predetermined time, while displaying an alert indication different from predetermined alert indications, the digital single-lens reflex camera 100 switches to a state (the state (d) in FIG. 3) in which a display operation is stopped for power saving.

Figure 4:
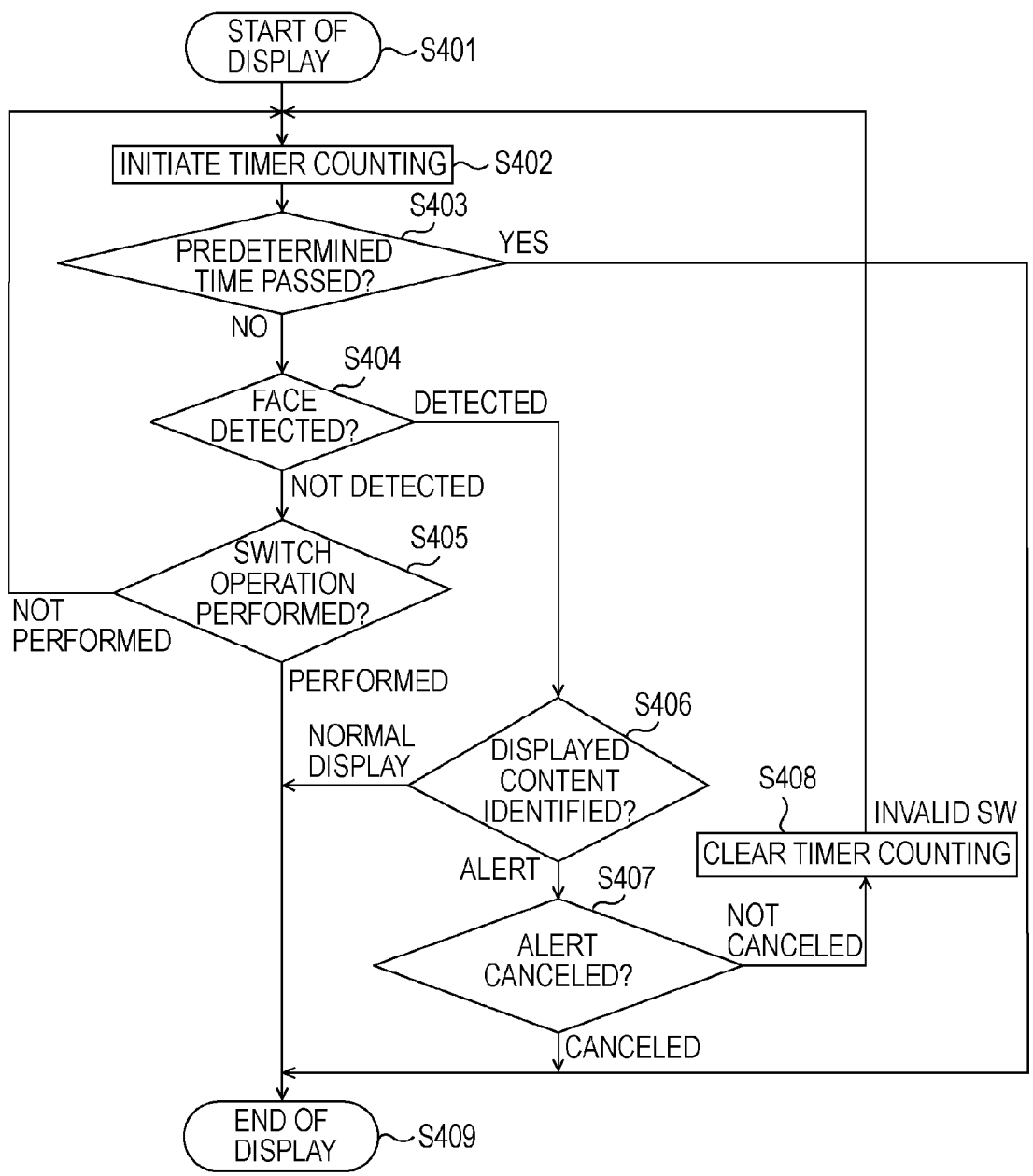
FIG. 4 is a flowchart illustrating a control operation of the image display device of the digital single-lens reflex camera.

FIG. 4 is a flowchart illustrating a control operation of the image display device 28 of the digital single-lens reflex camera 100 according to the first embodiment. After the image display device 28 initiates displaying, as content, an image, camera-state information, or an alert indication (step S401), in step S402, a timer is activated to initiate timer counting in order to determine timing for stopping display of the content and to periodically perform face detection.

In step S403, it is determined whether a predetermined time has passed since the start of display. If the predetermined has not passed yet, in step S404, face detection is performed.

If, in step S404, it is determined that the face detection has been performed, the operation proceeds to step S406 in which the system control circuit 50 identifies the currently displayed content. When the displayed content is an ordinary image, camera-state information, or an alert indication at such a level to draw attention, the operation proceeds to step S409 and immediately stops a display operation. Alternatively, when the displayed content is an alert indication representing imaging prohibition, in step S407, it is checked whether a switch operation for canceling the alert indication has been performed. If the switch operation has not been performed, or the switch operation has been performed for use different from the purpose of canceling the alert indication, in step S408, timer counting is cleared (initialized), and the operation returns to step S402 to restart the timer counting. Alternatively, if, in step S407, the switch operation for canceling the alert indication has been performed, the operation proceeds to step S409 and stops display of the content.

If, in step S404, it is determined that the face detection has not been performed, the operation proceeds to step S405 in which it is determined whether some switch operation has been performed. If the switch operation has not been performed, the operation returns to step S402 and continues the timer counting. If the switch operation has been performed, the operation proceeds to step S409 in which the display of the content is stopped in order to perform processing in response to the switch operation.

If, in step S403, it is determined that the predetermined time has passed, the operation proceeds to step S409 and immediately stops display of the content.

As described above, while the alert indication of imaging prohibition is being displayed on the image display device 28 on the back surface of the digital single-lens reflex camera 100, display of the alert indication is prevented from being stopped. Thus, the user is allowed to understand that the digital single-lens reflex camera 100 is not in an ordinary camera state, whereby the user can be urged to perform an appropriate return procedure. This can suppress inconvenience of display by the image display device 28 and can achieve power saving, and the original role of the alert indication can be prevented from being damaged.

In the first embodiment, when the need to display the alert indication of imaging prohibition occurs during imaging by the digital single-lens reflex camera 100, the alert indication of imaging prohibition is preferentially displayed. Thus, even if display of the content is stopped because of face detection during a photographing operation, the alert indication of imaging prohibition may be displayed.

Second Embodiment

In a second embodiment of the present invention, while the alert indication of imaging prohibition is being displayed on the image display device 28, even if face detection is performed, the digital single-lens reflex camera 100 can alter a display manner of the alert indication as well as not stopping display of the alert indication. The configuration of the digital single-lens reflex camera 100 according to the second embodiment is similar to that described in the first embodiment. Accordingly, differences from the first embodiment are mainly described below.

Figure 5:
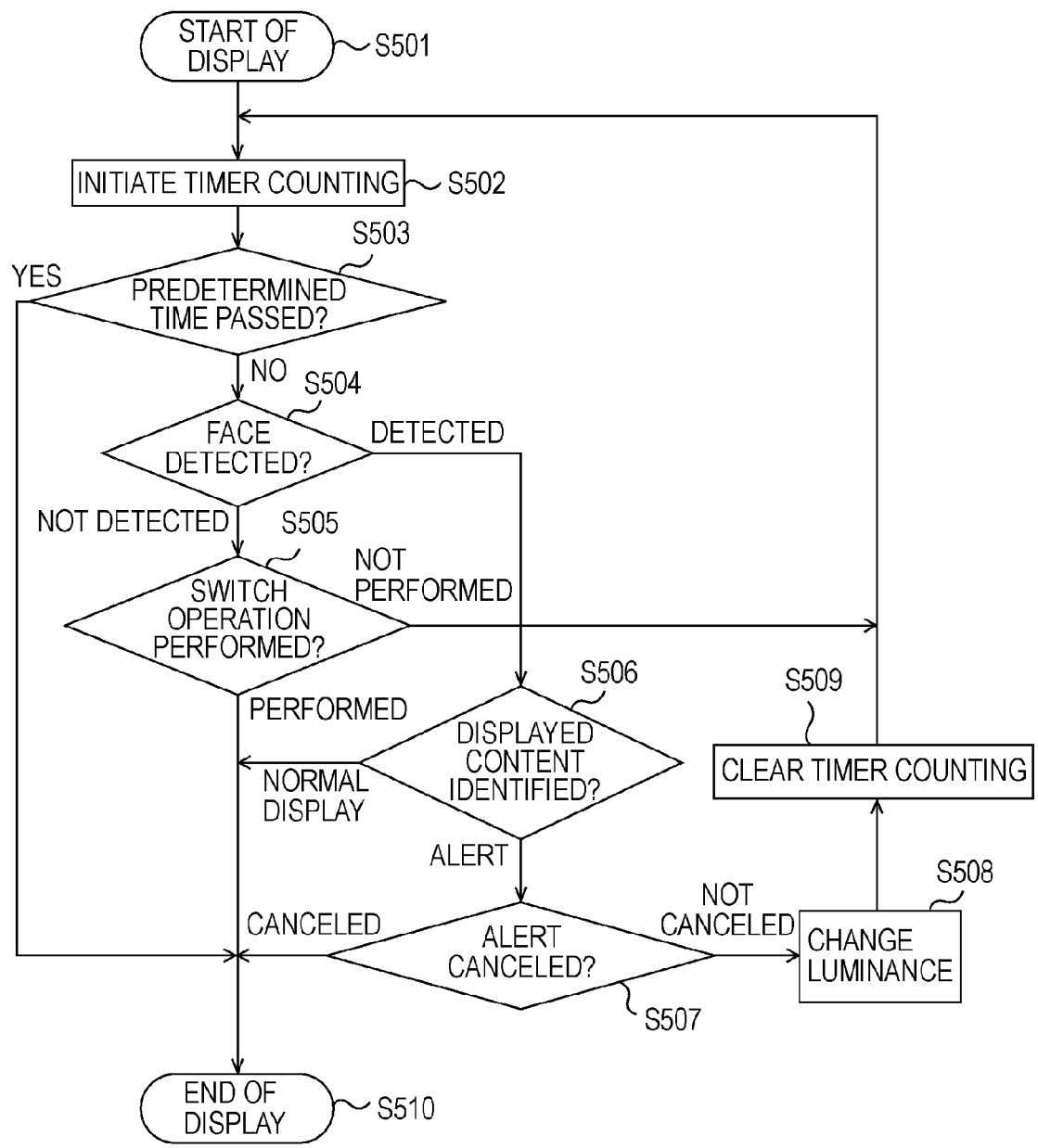
FIG. 5 is a flowchart illustrating a control operation of a digital single-lens reflex camera according to a second embodiment of the present invention.

FIG. 5 is a flowchart illustrating a control operation of the image display device 28 of the digital single-lens reflex camera 100 according to the second embodiment. After the image display device 28 initiates displaying, as content, an image or camera-state information (step S501), in step S502, a timer is activated to initiate timer counting in order to determine timing for stopping display of the content and to periodically perform face detection.

In step S503, it is determined whether a predetermined time has passed since the start of display. If the predetermined time has not passed yet, in step S504, it is determined whether face detection has been performed.

If, in step S504, it is determined that the face detection has been performed, in step S506, the currently displayed content is identified by the system control circuit 50. When, in step S506, the currently displayed content is identified as one of an ordinary image, photographing information, and alert indication at such a level to draw attention, in step S510, display of the content is immediately stopped. Alternatively, when, in step S506, the currently displayed content is identified as alert indication of imaging prohibition, in step S507, it is determined whether a switch operation for canceling the alert indication has been performed. If the switch operation has not been performed at all, or the switch operation for canceling the alert indication has not been performed, in step S508, the luminance of the alert indication is darkened for the purpose of achieving power saving. After that, in step S509, the timer counting is cleared (initialized) before the operation returns to step S502 and restarts the timer counting.

If, in step S504, it is determined that the face detection has not been performed, in step S505, it is checked whether some switch operation has been operated. If completely no switch operation has been performed, the operation returns to step S502 and continues the timer counting. If the switch operation has been performed, in step S510, display of the content is stopped in order to perform processing in response to the switch operation.

If, in step S503, it is determined that the predetermined time has passed, the operation proceeds to step S510 and immediately stops display of the content.

In the second embodiment, in step S508, the luminance of the displayed content is darkened for the purpose of power saving. However, conversely, the luminance may be increased in order to clearly show the alert indication.

Third Embodiment

In a third embodiment of the present invention, while the alert indication of imaging prohibition is being displayed on the image display device 28, even if face detection is performed, the digital single-lens reflex camera 100 can alter a display manner of the alert indication as well as not turning off the alert indication. The configuration of the digital single-lens reflex camera 100 according to the third embodiment is similar to that described in the first embodiment. Accordingly, differences from the first embodiment are mainly described below.

Figure 6:
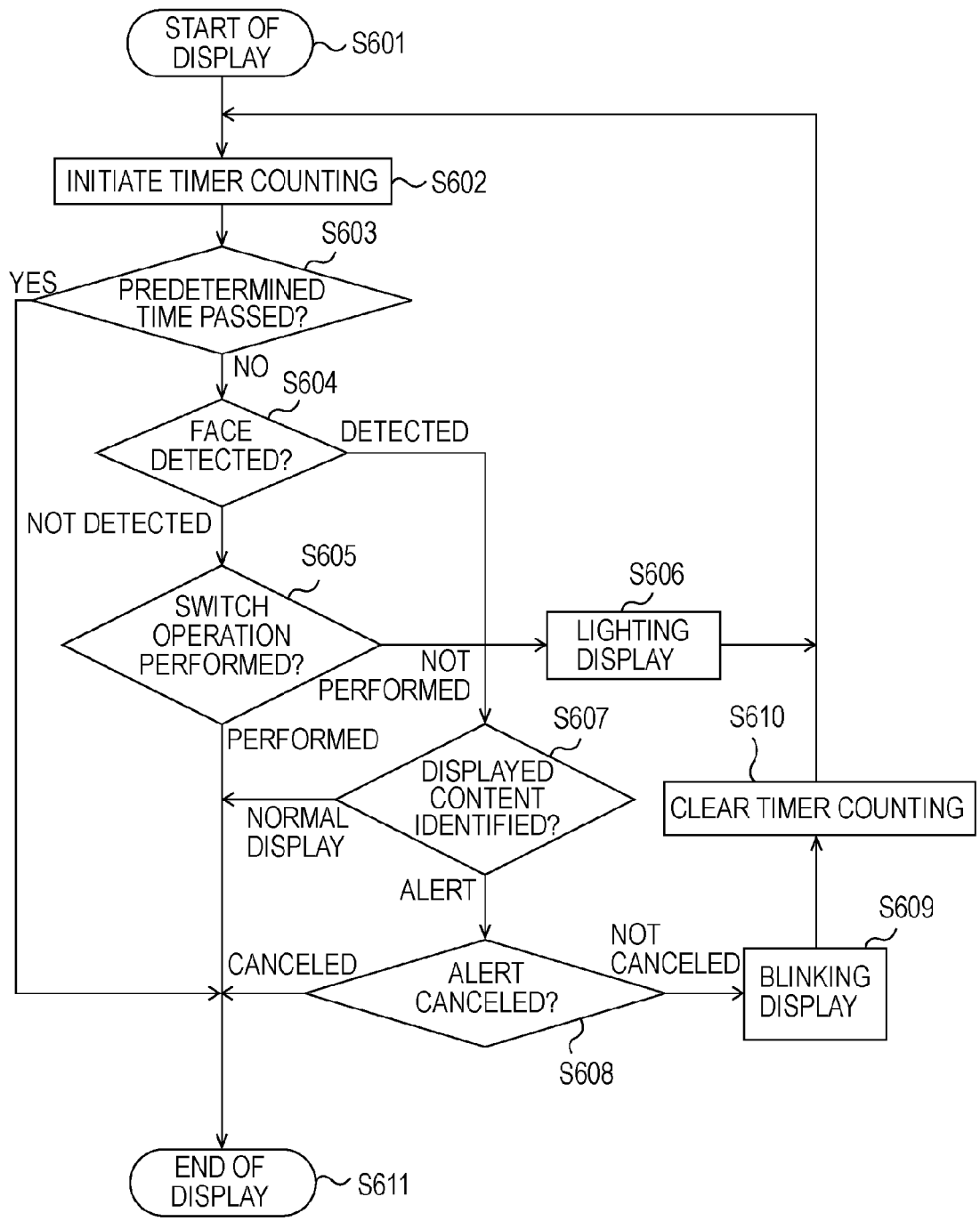
FIG. 6 is a flowchart illustrating a control operation of a digital single-lens reflex camera according to a third embodiment of the present invention.

FIG. 6 is a flowchart illustrating a control operation of the image display device 28 of the digital single-lens reflex camera 100 according to the third embodiment. After the image display device 28 initiates displaying, as content, an image or camera-state information (step S601), in step S502, a timer is activated to initiate timer counting in order to determine timing for stopping display of the content and to periodically perform face detection.

In step S603, it is determined whether a predetermined time has passed since the start of display. If the predetermined time has not passed yet, in step S604, it is determined whether the face detection has been performed.

If, in step S604, it is determined that the face detection has been performed, in step S607, the currently displayed content is identified by the system control circuit 50. When, in step S607, the currently displayed content is identified as one of an ordinary image, photographing information, and alert indication at such a level to draw attention, in step S611, display of the content is immediately stopped. Alternatively, when, in step S607, the currently displayed content is identified as alert indication of imaging prohibition, in step S608, it is determined whether a switch operation for canceling the alert indication has been performed. If a switch operation has not been performed at all, or the switch operation for canceling the alert indication has not been performed, in step S609, lighting display of the content is switched to blinking display of the content for the purpose of emphasizing the alert indication. After that, in step S610, the timer counting is cleared (initialized) before the operation returns to step S602 and restarts the timer counting.

If, in step S604, it is determined that the face detection has not been performed, in step S605, it is checked whether some switch operation has been operated. If completely no switch operation has been performed, in step S606, display of the content is switched to blinking display. After that, the operation returns to step S602 and continues the timer counting. If the switch operation has been performed, in step S611, display of the content is stopped in order to perform processing in response to the switch operation.

If, in step S603, it is determined that the predetermined time has passed, the operation proceeds to step S611 and immediately stops display of the content.

Fourth Embodiment

In a fourth embodiment of the present invention, while an alert indication of imaging prohibition is being displayed on the image display device 28, a set time of the timer can be changed. This is an example in which, by avoiding implementation of face detection as much as possible, power consumption necessary for the face detection can be reduced. The configuration of the digital single-lens reflex camera 100 according to the fourth embodiment is similar to that described in the first embodiment. Accordingly, differences from the first embodiment are mainly described below.

Figure 7:
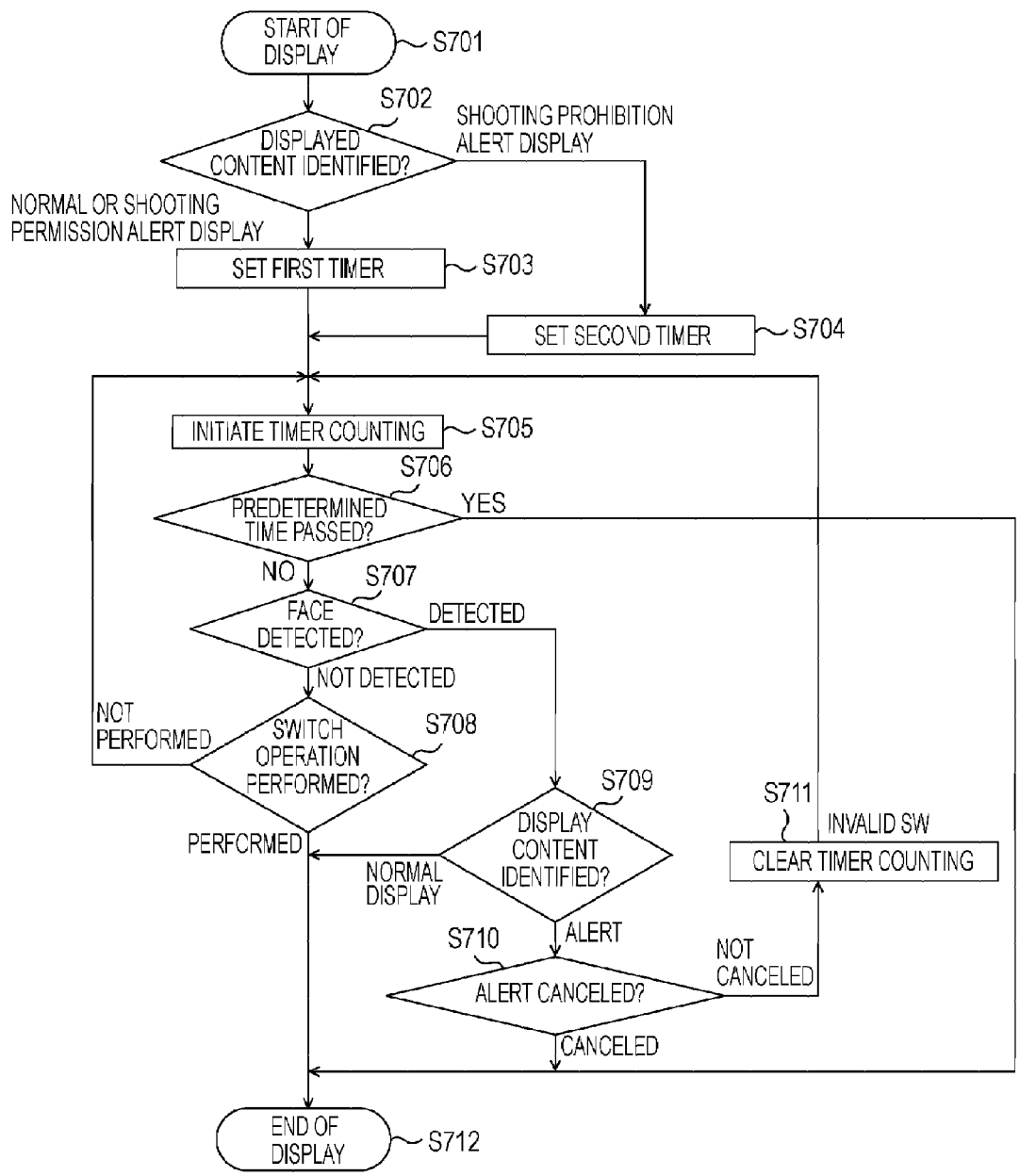
FIG. 7 is a flowchart illustrating a control operation of a digital single-lens reflex camera according to a fourth embodiment of the present invention.

FIG. 7 is a flowchart illustrating a control operation of the image display device 28 of the digital single-lens reflex camera 100 according to the fourth embodiment. After the image display device 28 initiates displaying, as content, an image or camera-state information (step S701), in step S702, the currently displayed content is identified by the system control circuit 50. When, in step S702, the currently displayed content is identified as one of an ordinary image, photographing information, and alert indication at such a level to draw attention, in step S703, a first timer is set. Alternatively, when the displayed content is identified as the alert indication of imaging prohibition, in step S704, a second timer is set. A set time of the second timer is longer than that of the first timer.

After that, in order to determine timing for stopping display of the content and to periodically perform face detection, in step S705, either timer is activated to initiate timer counting in accordance with the setting in step S703 or S704.

In step S706, it is determined whether a predetermined time has passed since the start of display. If the predetermined time has not passed yet, in step S707, face detection is performed.

If, in step S707, it is determined that the face detection has been performed, in step S709, the currently displayed content is identified by the system control circuit 50. When, in step S707, the currently displayed content is identified as one of an ordinary image, photographing information, and alert indication at such a level to draw attention, in step S712, display of the content is immediately stopped. Alternatively, when, in step S707, the currently displayed content is identified as alert indication of imaging prohibition, in step S710, it is determined whether a switch operation for canceling the alert indication has been performed. If a switch operation has not been performed at all, or the switch operation for canceling the alert indication has not been performed, in step S711, the timer counting is cleared (initialized) before the operation returns to step S705 and restarts the timer counting.

If, in step S707, it is determined that the face detection has not been performed, in step S708, it is checked whether some switch operation has been operated. If completely no switch operation has been performed, the operation returns to step S705 and continues the timer counting. If the switch operation has been performed, in step S712, display of the content is stopped in order to perform processing in response to the switch operation.

If, in step S706, it is determined that the predetermined time has passed, the operation proceeds to step S712 and immediately stops display of the content.

Obviously, the present invention can be achieved also by providing a system or apparatus with a recording medium containing program code of software for realizing functions of the foregoing embodiments, and, with a computer (a CPU (central processing unit) or MPU (microcomputer unit)) of the system or apparatus, reading and executing the program from the recording medium.

In this case, the program code read from the recording medium, itself, realizes the functions of the foregoing embodiments. Therefore, the program code itself and the recording medium containing the program code are included in the present invention.

As recording media for providing the program code, for example, a flexible disk, a hard disk, an optical disk, a magneto-optical disc, a CD-ROM (compact-disc read-only memory), a CD-R (compact disc recordable), a magnetic tape, a nonvolatile memory card, a ROM, etc., may be used.

In addition, it is obvious that the present invention includes a case in which, by executing the read program code with the computer, the functions of the foregoing embodiments are realized, and, in addition, on the basis of instructions of the program code, by executing all or part of actual processing with a basic system or operating system running on the computer, the processing realizes the functions of the foregoing embodiments.

Furthermore, the present invention includes a case in which, after the program code read from the recording medium is written into a memory provided on an add-on board inserted in the computer or in an add-in unit connected to the computer, on the basis of instructions of the program code, a CPU of the like of the add-in board or unit executes all or part of actual processing, whereby the processing realizes the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-001428 filed Jan. 6, 2006, which is hereby incorporated by reference herein in its entirety.

What is claimed is:

1. An image pickup apparatus including a display device for displaying alert information and others, the image pickup apparatus comprising:
   a) an approach detecting unit which detects approach of an object to the image pickup apparatus; and
   b) a control unit which, determines whether the alert information is displayed on the display device and when the approach detecting unit detects the approach of the object, controls whether to stop a display operation of the display device based on the determination.

2. The image pickup apparatus according to claim 1, wherein the approach detection unit is configured to detect approach of an object to an optical finder of the image pickup apparatus.

3. The image pickup apparatus according to claim 1, wherein:
   when the control unit determines the content displayed on the display device as the alert information, if the approach detecting unit detects the approach of the object, the control unit performs control so as not to stop a display operation of the display device; and
   when the control unit determines the content displayed on the display device as content different from the alert information, the control unit performs control to stop a display operation of the display device in response to detection of the approach of the object by the approach detecting unit.

4. The image pickup apparatus according to claim 1, wherein:
   alert levels of the alert information include a first alert level prohibiting a photographing operation and a second alert level;
   when the content displayed on the display device is determined as content having the first alert level, the control unit performs control so as not to stop a display operation of the display device if the approach detecting unit detects the approach of the object; and
   when the content displayed on the display device is determined as content having the second alert level, the control unit performs control to stop a display operation of the display device in response to detection of the approach of the object by the approach detecting unit.

5. The image pickup apparatus according to claim 3, further comprising an operating member that is capable of being operated by a user to stop display of the alert information,
   wherein the control unit performs control to stop displaying the alert information in response to an operation of the operating member.

6. The image pickup apparatus according to claim 3, wherein, when the content displayed on the display device is determined as the alert information by the control unit, if the approach detecting unit detects the approach of the object, the control unit performs control not to stop a display operation of the display device, and changes a display manner of the display device.

7. The image pickup apparatus according to claim 6, wherein the control unit changes the display manner of the display device by changing a display luminance.

8. The image pickup apparatus according to claim 6, wherein the control unit changes the display manner of the display device by switching lighting display to blinking display.

9. An image pickup apparatus including a display device for displaying alert information and others, the image pickup apparatus comprising:
   a) an approach detecting unit which detects approach of an object to the image pickup apparatus;
   b) a display control unit which stops a display operation of the display device in response to detection of the approach of the object by the approach detecting unit; and
   c) a control unit which determines whether the alert information is displayed on the display device and sets an operating period of the approach detecting unit based on the determination.

10. The image pickup apparatus according to claim 9, wherein the approach detection unit is configured to detect approach of an object to an optical finder of the image pickup apparatus.

11. The image pickup apparatus according to claim 9, wherein, when the content displayed on the display device is determined as the alert information by the control unit, the operating period setting unit sets an operating period of the approach detecting unit to be longer than when the content displayed on the display device is determined as content different from the alert information.

12. A method for controlling an image pickup apparatus, comprising:
   determining whether alert information is displayed on a display device of an image pickup apparatus;
   detecting approach of an object to an optical finder of the image pickup apparatus; and
   when approach of an object to the optical finder is detected, controlling whether to stop a display operation of the display device based on a result of determination of whether alert information is displayed on the display device.

13. The method according to claim 12, further comprising:
   not stopping a display operation of the display device if approach of an object to the optical finder is detected and alert information is displayed on the display device.

14. A method for controlling an image pickup apparatus, comprising:
   determining whether alert information is displayed on a display device of an image pickup apparatus;
   changing an operating period of an approach detecting unit based on a result of determination of whether alert information is displayed on the display device; and
   using the approach detecting unit to detect approach of an object to an optical finder of the image pickup apparatus.

15. The method according to claim 14, further comprising:
   not stopping a display operation of the display device if approach of an object to the optical finder is detected and alert information is displayed on the display device.

* * * * *